March 11, 1958    H. R. C. ANTHONY ET AL    2,826,681
MULTICELL BATTERY
Filed Jan. 28, 1954

INVENTORS
Herman R.C. Anthony
Henry G. Friang
BY Beale and Jones
ATTORNEYS 2,826,681

MULTICELL BATTERY

Herman R. C. Anthony, Madison, and Henry G. Friang, Wausau, Wis., assignors, by mesne assignments, to The Electric Storage Battery Company, Philadelphia, Pa., a corporation of New Jersey Application January 28, 1954, Serial No. 406,742

13 Claims. (Cl. 240—10.61)

This invention relates to a new multicell battery which is adapted for use in conventional flashlights or as a disposable battery unit in a throw-away type flashlight.

Conventional flashlights now in use generally consist of at least three separate parts. These parts include a head containing the reflector and lamp, generally in the form of a pre-focused unit; a body portion which is nothing more than a cylindrical, open-end tube on which is mounted the switch; and a bottom closure which is usually provided with a spring to compress the dry cells and thereby assure good electrical contact. This type of flashlight is admirably suited for many purposes. It is rugged and adaptable to a plurality of uses because of the switching and focusing features which are available. However, while this structure is desirable for many purposes, it is an expensive structure to manufacture and has some defects which are inherent in this type of design. For example, when a dry cell employed within this type of flashlight leaks, the corrosive fluids released by the cell will frequently cause the head and bottom members to become so corroded that they are "frozen" to the tubular portion of the flashlight. In addition, the switch mechanism is a frequent source of trouble and is one of the most expensive parts of the entire structure to manufacture successfully.

Finally, the three-component type of structure is rather complex to manufacture in that a great many separate operations are required, and a relatively large number of separate parts are required to be assembled into the final, three-component structure.

The object of the present invention is to provide a relatively simple flashlight structure which is inexpensive to manufacture.

A further object of the invention is to provide a metallic casing for a plurality of dry cells, which casing serves both to enclose the cells and as the tubular casing and bottom closure member in a conventional flashlight.

Another object of the invention is to provide an inexpensive flashlight component which may be discarded when its useful life has been expended.

Still another object of the invention is to provide a component part of a flashlight structure which has a minimum number of parts.

Yet another object of the invention is to provide a flashlight structure in which the damage caused by cell leakage is minimized by having the casing of the cells function as the tubular member of the flashlight, the whole being disposable when the life of the dry cells has expired.

These and other objects of the invention may be achieved by enclosing a plurality of dry cells within a metal jacket lined with an insulating tube which forms a barrier to the passage of electrolyte and the corrosive products of the dry cell reaction. The requisite number of dry cells are placed within the lined metal jacket and the top and bottom edges of the metal jacket curled over so as to exert a compressive force on the cells contained therein. The battery unit thereby produced comprises a plurality of cells enclosed with a tube of insulating material. Each cell is individually sealed while within the insulating tube so that the paper tube functions as a part of the seal. The uppermost cell is similarly sealed but in addition has a top closure member which is insulated from the metal jacket by the insulating tube and which makes electrical contact with the inner electrode of the cell. A separate bottom closure member is also provided which is in electrical contact with the container electrode of the lower most dry cell and which may be either insulated from or in electrical contact with the metal jacket. The structure is completed by curling in the ends of the metal jacket to apply a compressive force to the cells and thereby seal the top and bottom of the battery unit while at the same time decreasing internal resistance in the battery.

The details of these structures may be best understood by reference to the drawings, in which.

Figure 1:
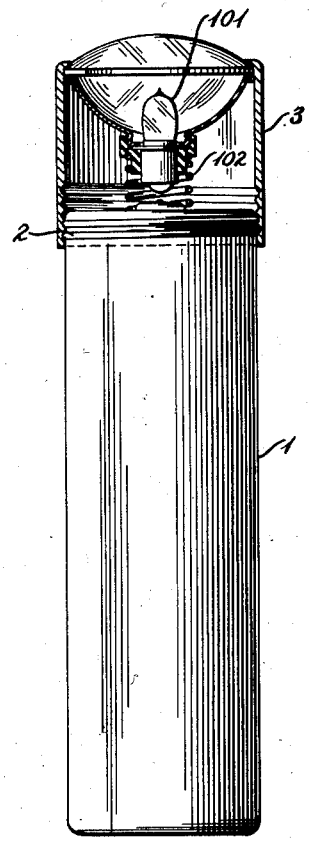
Fig. 1 is a vertical view in partial section of a battery structure of the present invention provided with a pre-focused flashlight head.
Figure 2:
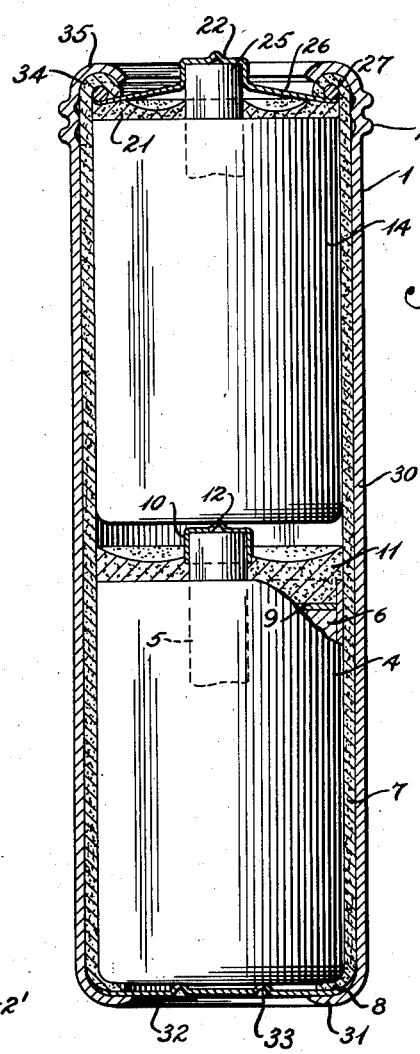
Fig. 2 is a vertical sectional view of one form of the battery structure of the invention.

Referring now to the drawings in detail, for the purpose of describing the invention clearly, the structure of the invention will be described as it applies to a structure for enclosing two conventionally-sized dry cells. It is to be understood, however, that the invention is equally applicable to three, four, five, or more dry cells where a convenient, disposable assembly of this size is desired.

As shown in Fig. 1 the battery structure 1 of the invention is desirably provided with threads 2 or other receptive means whereby a pre-focused flashlight head 3 may be removably attached thereto.

In making the battery structure of the present invention, a container electrode 4 containing inner electrode 5 and depolarizer mix 6 may be inserted within an insulating tube 7 having an inturned flange 8. A sealing washer 9 may be placed so as to provide an air space above the depolarizer mix 6 before the cell is inserted within the insulating tube. The inner electrode 5 is desirably provided with a brass or other suitable cap 10 which provides good contact between adjacent cells and also assists in sealing the cell.

When the cell is in place within the insulating tube 7, a layer of sealing compound 11 may be poured over the top of the sealing gasket 9 in order to seal the electrolyte within the cell. The sealing material 11 is preferably a hardenable substance which sets rapidly upon cooling, such as asphalt.

It has been found desirable that the sealing material completely fill the space within the container electrode above the sealing gasket and extend a further distance above the top edge of the container to form a seal with the insulating tube. The sealing material thereby forms an effective seal against the surface of the container electrode and the insulating tube at the periphery of the cell and against the surface of the inner electrode and cap 10 at the center of the cell.

When this mode of assembly is employed, it sometimes happens that a small amount of the sealing material 11 may splash or spill on the top surface of cap 10 which has been placed over the inner electrode 5. In order to insure good contact between cells, despite any such spillage or splashing, the cap 10 is preferably provided with a sharp point or group of points 12 centrally located thereon. These points 12 may be provided merely by punching through the cap. It has been found that when a sharp projecting point is provided on the cap 10, the projection will cut through any overlying sealing material 11 to establish good contact with the bottom surface of the superjacent cell.

A second cell 14 may be placed within the tube directly over the first cell. This cell may be sealed in the same manner as the first cell. The first step is providing the cell with a suitable sealing gasket and then covering the gasket with a layer of sealing material, such as asphalt. A top closure 22 of tin-plated steel or other suitable substance is then placed over the end of the inner electrode 25. The top closure member 22 is provided with a skirt portion 26 with a curled-over end portion 27, which engages the inner wall of the paper insulating tube 7. The top wall of the paper tube may then be crimped over the end portion 27 of the skirt to encase the cells within the paper tube.

This assembly is then preferably inserted within a steel tube 30 having an inturned end flange 31. In order to establish electrical contact between the steel jacket 30 and the bottom of the container electrode 4 of the lower cell, a metallic disc 32, preferably of tin-plated steel, is placed on the inturned end flange 31 of the steel jacket 30 before the paper-encased cells are inserted therein. This bottom disc 32 may be provided with an embossed design 33 which is decorative and which also assists in establishing good contact between the container electrode 4 and the steel jacket 30. Tin-plated steel is preferred as the material for the bottom disc 32, since this material is resistant to corrosion by the electrolyte of the cell. While tin-plated steel is preferred, any suitable substance may be employed.

As a final step in securing the dry cells firmly within the steel jacket 30, the top sidewalls 35 of the steel jacket are crimped over the top of the insulating tube 34. Sufficient force is used in the crimping step that some compression is exerted upon the cells by the inturned end flange formed by the crimped-over sidewalls 35. This compression assures good contact between the cells and also imparts rigidity to the structure and contributes to its overall strength. The inturned end flange 34 of the insulating tube 7 serves to insulate the steel jacket from the top closure.

The steel jacket 30 may be formed in a plurality of ways. A simple and preferred method of making this tube is to roll up a flat sheet. The sheet is then secured by a butt weld, by crimping, or by some other suitable joint, where the two ends meet. When this type of manufacturing method is employed, the threads 2 may be stamped into the steel jacket while it is in flat, sheet form. A substitute for the threads 2, a series of small nibs 2' of point-type projections may be raised in the steel jacket along a path simulating the path of conventional threads. This modified form of the thread structure is illustrated in Fig. 3.

It is to be noted that the tube 7 insulates the steel jacket 30 from the container electrodes of the dry cells. The paper insulating tube should also be sufficiently long at its inturned end flanges to insulate the inturned end flanges of the steel jacket. Thus, at the bottom of the cell the inturned flange 8 of the paper tube 7 may extend slightly beyond the terminal of the inturned end flange 31 of the steel jacket 30. Electrical contact with the bottom of the container electrode is made through the bottom disc 32. At the top of the battery structure, the inturned upper end flange 35 of the steel jacket is insulated from the top closure member 22 by the inturned end flange 34 of the paper tube.

Figure 3:
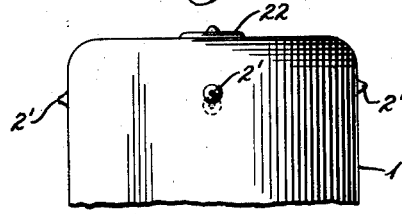
Fig. 3 is a partial vertical sectional view of a modified form of the invention.
Figure 3:
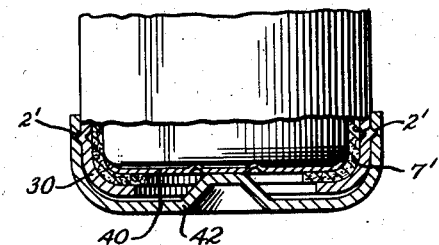

In the modification of the invention illustrated in Fig. 3 of the drawings the bottom closure member 40 is placed in direct contact with the bottom of the container electrode of the lowermost cell. The bottom member is then insulated from the metal jacket 30 by the curled in edge of insulating tube 7. A separate bottom cap 42 may be detachably secured to the metal jacket by friction fit or by suitable threaded or other receptive means. The bottom cap 42 is preferably provided with a raised central portion 43 which is adapted to make electrical contact with the bottom cell terminal 40 when the cap 42 is placed on the metal jacket. With this structure the metal jacket 30 may be placed in the electrical circuit or not as desired merely by attaching bottom cap 42. When used as the battery unit in a throw-away type flashlight, the bottom cap can serve as switching means whereby movement of the raised portion 43 in and out of contact with bottom terminal 40 is effective in switching the light on and off.

The battery unit of Fig. 3 may also be used as the source of electrical energy in the conventional 2 or 3 cell flashlight. When used for this purpose, it will be understood that the bottom cap 42 is usually omitted so that bottom terminal 40 is electrically insulated from the metal jacket of the battery. The electrical circuit is completed by contact between the bottom terminal 40 and the spring element of the conventional flashlight bottom closure which is electrically connected with the lamp through the flashlight case and the switch mounted thereon.

It has previously been proposed to seal a dry cell with a poured wax or asphalt seal and to enclose the sealed dry cell in a paper insulating jacket and then in an outer steel shell. The present invention adapts this steel jacketed dry cell structure to a multicell unit in which the poured seal of each individual cell of the unit utilizes the insulating tube to effectively seal each cell from the other cells in the unit. Where the unit encloses two dry cells, it is a convenient package for use in a conventional, three piece, 2-cell flashlight. When the unit is provided with threaded or other receptive means 2, it may form the body of a flashlight itself. The flashlight structure is completed by the addition of a pre-focused head 3 in which electrical contact with the dry cells is provided through the steel jacket 30 and through contact by the bulb 101 with the top closure member 22. Switching action is provided by moving the entire top member 3 along the threads 2 so that the bulb moves either into or out of contact with the top closure member. When the dry cells become weak, or when their life has expired, the entire battery unit 1 may be thrown away. The flashlight head 3 may be kept for re-use with a fresh battery unit. If desired, a spring 102 may be employed to resist the movement of the bulb 101 into contact with the top closure member 22. When such a spring is employed, accidental switching on of the flashlight caused by vibration or other shocks to the flashlight structure is prevented.

In the flashlight head 3 depicted in the drawings for purposes of illustration only, a simple type of construction is shown. It should be understood, however, that the flashlight head may take any suitable form, and that many modifications will occur to those skilled in the art which may be employed with the battery unit of this invention.

We claim:

1. A battery comprising a cup electrode of a first dry cell within a tube of insulating material, sealing material enclosing the open end of said cup electrode and engaging the inner walls of said tube, the internal electrode of said first dry cell extending through said sealing material and making electrical contact with the superposed bottom of a cup electrode of a second dry cell, sealing material enclosing the open end of said second cup electrode and engaging the inner walls of said tube, a top closure member in electrical contact with the internal electrode of said second cell and engaging the inner walls of said tube of insulating material, said tube and cells being enclosed within a metallic jacket maintaining said cells under compression.

2. The battery unit of claim 1 in which the metallic jacket is provided with receptive means for a flashlight head.

3. The battery unit of claim 1 in which a bottom closure member is in electrical contact with the cup electrode of said first dry cell and insulated from said metallic jacket.

4. A leak-resistant battery unit comprising a plurality of cylindrical dry cells in superposed relation and in series electrical contact, each cell comprising a cup electrode containing active cell ingredients and a pencil-like interior electrode, each cell being sealed by a snugly fitted washer and by sealing material which extends beyond the confines of the cup and is enclosed by a sheath of insulating material in tubular form which encases all of the cells, a metallic closure covering the open end of the uppermost cell in electrical contact with the pencil-like electrode thereof and engaging the inner side walls of said insulating sheath, and an outer metallic jacket having an inturned end flange at each end engaging the insulating sheath, and in electrical contact with the cup electrode of the lowermost cell.

5. A battery unit of claim 4 in which electrical contact between the metallic jacket and the cup electrode of the lowermost cell is achieved through a metallic disc in electrical contact with the cup electrode of the lowermost cell and secured between an inturned end flange of said insulating sheath and an inturned end flange of said outer metallic jacket.

6. The battery unit of claim 4 in which the metallic jacket is exteriorly threaded about its periphery so as to detachably receive a flashlight head.

7. A subassembly for a battery unit comprising a first dry cell supported within a tube of insulating material by a inturned end flange of said tube, sealing material which both seals off the top of said first dry cell and engages the inner walls of said tube, the internal electrode of said first dry cell extending through said sealing material and making electrical contact with a bottom of a second dry cell also having sealing material which both seals off the top of said second dry cell and engages the inner walls of said tube, a conductive closure member over the sealing material of said second dry cell and in electrical contact with an electrode of said second cell and having a skirt portion engaging the inner walls of said tube of insulating material, and an inturned end flange of said tube enclosing the cells within said tube.

8. In combination, a battery unit comprising a metal jacket, a plurality of dry cells sealed to an insulating tube within said jacket, said dry cells being in series, superimposed relation and insulated from said metal jacket, top and bottom closure members for said battery unit, a flashlight head attached to said battery, said metal jacket being electrically connected to said bottom closure member.

9. The combination of claim 8 in which said bottom closure in electrical contact with said dry cells is secured between an inturned end flange of the insulating tube and an inturned end flange of the metal jacket.

10. The combination of claim 8 in which a detachable bottom cap electrically connects said bottom closure and said metal jacket.

11. A battery comprising a plurality of dry cells which have cup-shaped outer electrodes and rod-like internal electrodes, said cells being in superimposed, series relationship within a tube of insulating material surrounded by a metal jacket, sealing material closing off the open ends of said cup-shaped electrodes and engaging the inner wall of said tube of insulating material.

12. The battery of claim 11 wherein the ends of the metal jacket are inwardly crimped to maintain the battery structure under compression.

13. The battery of claim 11 wherein the metal jacket is provided with receptive means for a flashlight head.

References Cited in the file of this patent

UNITED STATES PATENTS

| 1,297,654 | Burgess | Mar. 18, 1919 |
| 1,421,561 | Pugsley | July 4, 1922 |
| 2,198,423 | Anthony | Apr. 23, 1940 |
| 2,272,907 | Deibel | Feb. 10, 1942 |
| 2,526,692 | Ruben | Oct. 24, 1950 |

FOREIGN PATENTS

| 389,754 | Great Britain | Mar. 23, 1933 |